Jan. 25, 1966  G. J. HENSIEN  3,231,288
GASKET ASSEMBLY
Filed Oct. 16, 1962

GILBERT J. HENSIEN
INVENTOR

BY John R. Faulkner
Ernest A. Beutler
ATTORNEYS

United States Patent Office 3,231,288
Patented Jan. 25, 1966

3,231,288
GASKET ASSEMBLY
Gilbert J. Hensien, Harper Woods, Mich., assignor to Ford Motor Company, Dearborn, Mich., a corporation of Delaware
Filed Oct. 16, 1962, Ser. No. 230,907
2 Claims. (Cl. 277—166)

This invention relates to a gasket assembly and more particularly to a gasket assembly in which means are provided to limit the degree of gasket compression.

Where it is necessary to provide a seal between adjacent surfaces, it is frequently desirable to utilize a readily compressible gasket formed from cork, rubber or other similar material. The readily compressible gasket will permit the use of low tolerance surface finishes inasmuch as it can provide a good seal between irregular adjacent surfaces. The degree of compression of the gasket should be limited, however, since an overly compressed gasket cannot be reused and often results in an improper seal.

It is, therefore, the principal object of this invention to provide an improved means for limiting gasket compression.

In a gasket assembly embodying this invention, a readily compressible gasket is interposed between adjacent gasket engaging surfaces. Threaded fastening means are provided for compressing the gasket between the adjacent surfaces. The gasket is apertured to receive the threaded fastening means, and compression limiting means encircle the threaded fastening means and extend for at least a portion of the length of the aperture in the gasket. The compression limiting means limits the compression of the gasket by positive engagement.

Further objects and advantages of this invention will become more apparent as this description proceeds, particularly when considered in conjunction with the accompanying drawings, wherein.

Figure 1:
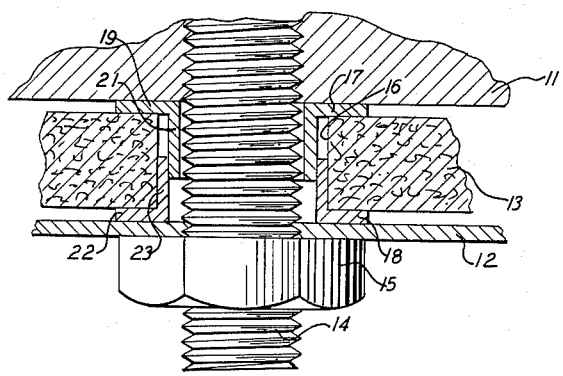
FIGURE 1 is a cross sectional view of a gasket assembly incorporating this invention showing the gasket in an uncompressed state.

Although the gasket assembly which comprises this invention may be utilized in varied applications, an internal combustion engine offers several areas in which this invention may be advantageously practiced. For example, in the depicted embodiment of the invention, the gasket assembly is illustrated in conjunction with the crankcase of an engine.

Referring now specifically to the drawings, a portion of a lower flange of an internal combustion engine cylinder block is identified by the reference numeral 11. A flange 12 of a sheet metal crankcase is positioned adjacent the cylinder block flange 11. Interposed between adjacent surfaces of the flanges 11 and 12 is a readily compressible composition gasket 13.

Figure 2:
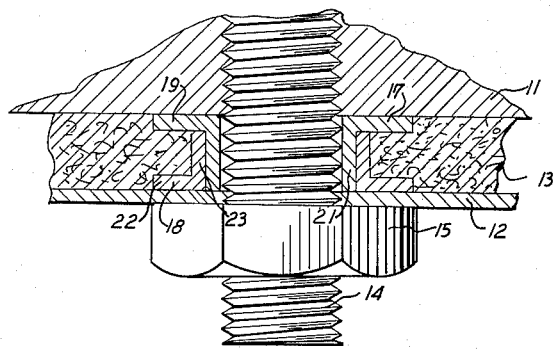
FIGURE 2 is a cross sectional view, in part similar to FIGURE 1, showing the gasket in the compressed state.

The crankcase is secured to the engine block flange 11 by a plurality of studs 14 and nuts 15 (only one being shown) spaced at uniform intervals along the flange 11. The stud 14 extends through an enlarged aperture 16 formed in the gasket 13. When the nut 15 is threaded onto the stud 14 and tightened, the flanges 11 and 12 are brought into sealing engagement with the adjacent surfaces to the gasket 13 (FIGURE 2). Further tightening of the nut 15 compresses the gasket 13 to form an oil tight seal.

Compression limiting members 17 and 18 are positioned in the aperture 16 of the gasket 13. The compression limiting member 17 comprises a flange portion 19 that is interposed between adjacent sealing surfaces of the gasket 13 and the flange 11. A tubular portion 21 extends from the flange 19 into the aperture 16 toward the flange 12 for a predetermined distance.

The compression limiting member 18 comprises a flange portion 22 interposed between the gasket 13 and the flange 12 and a tubular portion 23 that extends into the aperture 16 between the tubular portion 21 and the gasket 13. The tubular portion 23 extends for a distance that is at least equal to the length of the tubular portion 21.

As the nut 15 is threaded onto the stud 14 compressing the gasket 13, the end of the tubular portion 23 is brought into abutment with the flange 19 (FIGURE 2). When the tubular portion 23 abuts the flange 19, the person tightening the nut 15 will sense resistance to further tightening. The nut 15 cannot be further tightened without causing deformation of the tubular portion 23. The compression of the gasket 13 is thus dependent upon the length of the tubular portion 23. It should further be noted that by positioning compression limiting members 17 and 18 at each of the bolt receiving apertures in the gasket 13, uniform pull down will be insured along the entire length of the gasket.

Various changes from the illustrated, preferred embodiment are possible. For example, the tubular projection 23 may be formed integrally with the flange 12 rather than as a separate member. The compression limiting member 16 may also be dispensed with and the tubular projection 23 can abut the flange 11 directly to limit the compression of the gasket 13. It is to be understood that this invention is not to be limited to the exact construction shown and described, but that various other changes and modifications may be made without departing from the spirit and scope of the invention as defined by the appended claims.

I claim:
1. In combination, a readily compressible gasket having opposed sealing surfaces, an aperture formed in said gasket and extending between said sealing surfaces, and first and second compression limiting members received in said gasket, the first of said compression limiting members comprising a flange portion positioned in engagement with one of said sealing surfaces and a substantially rigid tubular portion extending from said flange portion into said aperture toward the other of said sealing surfaces for a predetermined distance, the second of said compression limiting members comprising a flange portion positioned in engagement with the other of said sealing surfaces and a substantially rigid tubular portion extending from said flange portion into said aperture between said gasket and the tubular portion of the first of said compression limiting members, the tubular portion of the second of said compression limiting members extending for a distance at least equal to the length of the tubular portion of the first of said compression limiting members whereby it will contact the flange portion of the first of said compression limiting members upon the predetermined compression of said gasket and limit further compression of said gasket.

2. A gasket assembly comprising a pair of members having adjacent engaging surfaces, a compressible gasket interposed between said members and having opposed sealing surfaces adapted to be engaged by said gasket engaging surfaces, an aperture formed in said gasket extending between said sealing surfaces, threaded fastening means extending through said aperture between said members for securing said members together and compressing said gasket, and first and second compression limiting members received in said gasket, the first of said compression limiting members comprising a flange portion interposed between one of the sealing surfaces of said gasket and the adjacent gasket engaging surface of one of said members and a substantially rigid tubular portion extending from said flange portion into the aperture between said gasket and said threaded fastening means, the second of said compression limiting members comprising a flange portion interposed between the other of the sealing surfaces of said gasket and the adjacent gasket engaging surface of the other of said members and a substantially rigid tubular portion extending from the flange portion into the aperture between said gasket and the tubular portion of the first of said compression limiting members, the tubular portion of the second of said compression limiting members being of a length that is at least equal to the length of the tubular portion of the first of said compression limiting members whereby the tubular portion of the second of said compression limiting members contacts the flange portion of the first of said compression limiting members upon predetermined compression of said gasket to limit further compression of said gasket.

References Cited by the Examiner

UNITED STATES PATENTS

| | | | |
|---|---|---|---|
| 1,856,051 | 4/1932 | Fryling | 277—11 |
| 1,980,335 | 11/1934 | Hewitt et al. | 277—166 X |
| 2,359,118 | 9/1944 | Johnston | 277—180 |

FOREIGN PATENTS 849,343  8/1939  France.

LAVERNE D. GEIGER, *Primary Examiner.*

SAMUEL ROTHBERG, *Examiner.*